United States Patent Office 3,414,899
Patented Dec. 3, 1968

3,414,899
APPARATUS FOR CALIBRATING DOPPLER-INERTIAL NAVIGATION SYSTEMS
Heinz Buell, Mount Kisco, N.Y., assignor to General Precision Systems Inc., a corporation of Delaware
Filed July 18, 1967, Ser. No. 654,223
14 Claims. (Cl. 343—9)

ABSTRACT OF THE DISCLOSURE

Apparatus for calibrating the alignment error between the Doppler antenna and the inertial platform produced by bending or flexure of the vehicle. A conventional directional gyro directly mounted on or near the Doppler antenna and approximately aligned to true north measures the true heading of the vehicle, the orientation error, and its own north alignment error. An error signal is extracted from this output proportional to the cross-track velocity error between the gyro and inertial platform and is fed back through a closed loop to the gyro's torquer for precessing its spin axis accordingly. Since the gyro's spin axis is effectively rotated into alignment with the inertial platform's reference axis, the north alignment error in the gyro's output is cancelled, the error input to the gyro's torquer is nulled, and the gyro becomes slaved to true north. Moreover, the output of the directional gyro now comprises only a measure of the true heading angle plus the orientation error and may therefore be used to accurately resolve the Doppler's ground track velocity information into true north and true east components. Accordingly transient errors in Doppler radar velocity resolution are avoided which would otherwise degrade the heading and the position accuracy of the stellar-inertial-Doppler system.

*Brief description of the invention*

The subject matter herein relates generally to self-contained vehicle navigational systems and more particularly, to a hybrid system of the so-called Doppler-inertial type wherein the Doppler antenna and the inertial platform are mounted at physically separate positions within the vehicle.

As is well-known navigational Doppler radars are usually configured to transmit three or more beams of radiant energy from an airborne vehicle at different angles relative to the earth and to receive a portion of the energy after reflection therefrom. Motion of the vehicle relative to the earth causes the frequency of the received energy to change, and by measuring and comparing the frequency shifts of the various beams, the ground speed and the drift angle of the vehicle can be determined. The nature of this reflection process causes the frequency of the returned signal to fluctuate rapidly and erratically thus leading to large errors in the instantaneous indication of ground speed and drift angle. Nevertheless, Doppler systems are capable of very high accuracy if the data be averaged over a period of, say, several minutes, and furthermore the accuracy will not deteriorate with the passage of time.

On the other hand, internal systems commonly comprise a gyroscopically stabilized horizontal platform on which are mounted at least two accelerometers for measuring accelerations in orthogonal directions in the plane of the platform. The accelerations so measured can be integrated to obtain velocities which can, in turn, be resolved to determine ground speed and drift angle. The accuracy of such systems depends among other things, upon the horizontality of the platform since the accelerometers cannot distinguish between accelerations caused by motion of the vehicle relative to the earth and the acceleration due to gravity. Even if the platform originally were erected to exact horizontality it would deviate therefrom after a time because of the inherent random drift of the gyroscopes used for stabilization. Hence, inertial systems have the disadvantage that their accuracy deteriorates rapidly with the passage of time although their instantaneous, or short-term, accuracy is excellent.

Doppler and inertial systems are thus seen to have complementary advantages, that is, the former has excellent long-term accuracy whereas the latter has excellent short-term accuracy. Stated another way, Doppler systems are inherently highly accurate in response to low frequency changes of input data but not to high frequency changes, while the reverse is true of inertial systems which respond well to high frequency components of input data but which respond poorly by themselves when following low frequency components. Moreover, comparing the two types, both are inaccurate at the cross-over region between high and low frequency inputs, and, even if the two separate systems be used simultaneously, their outputs would have the common defect of poor accuracy in the cross-over region.

However, by combining two systems of the Doppler and inertial types respectively into a unitary integrated system, it has been found possible to secure speed, drift, roll, pitch and heading data of great instantaneous accuracy and at all input frequencies, and this instantaneous accuracy is maintained indefinitely. A properly interconnected hybrid Doppler-inertial system may therefore be said to be better than either of its mentioned component subsystems can possible be as regards the quality of their respective outputs. In addition, the integration of both systems into a single combined system permits the erection and maintenance of a stable static vertical reference, from which may be secured a continuously highly accurate indication of vertical direction, and which is in general incapable of being furnished by either component system acting independently. Examples of such combined Doppler-inertial systems are fully disclosed in U.S. Patents Nos. 2,914,763 and 3,028,592.

Since the inertial platform in a Doppler-inertial system does in fact conveniently porvide an extremely accurate vertical reference it is possible to use a stellar-tracker in such systems in order to obtain the azimuth or heading output data. This is a highly desirable situation since stellar-trackers are capable of providing heading accuracies of the highest order when compared with other known heading reference devices such as, for example, a magnetic compass. Nonetheless, the use of a stellar-tracker in a Doppler-inertial system imposes the added constraint of directly mounting the tracker on or near the inertial platform because any physical separation between these two sensors would tend to introduce alignment errors in the vertical data due to structural bending or flexure of the vehicle's airframe. Since the accuracy of the tracker is limited by the accuracy of the vertical data provided by the platform, it follows that any misalignment between the tracker and the platform will appear directly as a heading error and indirectly as a position error in the system output. Thus, generally speaking, in stellar-inertial Doppler-systems, the stellar-tracker and inertial platform are intimately married together in the form of a single package or are mounted sufficiently close to one another to reduce the possibility of introducing an error in the transmission of vertical data.

Moreover, since stellar-trackers must observe the stars, they are usually mounted on the upper part of the fuselage or missile whereas Doppler antennas are typically mounted on the bottom to gain a clear view of the ground. Furthermore, in many applications it is desirable to mount the inertial platform close to other systems in the vehicle such as terrain followers, mapping radars, bombing aids, and the like. Hence, in most cases, the stellar-inertial package on one hand and the Doppler radar system on the other will be mounted in the vehicle with a vertical separation and more importantly a horizontal separation as well.

Unfortunately these physical separations cause an alignment problem which if not compensated for would adversely affect system performance. The problem arises from the fact that the stellar-inertial system measures the vehicle's velocity vector in the inertial platform's coordinate system whereas the Doppler radar measures the same velocity vector in its antenna coordinate system. Now in order to resolve the Doppler's measurement into the platform's coordinate system, which must be done for proper operation of the Doppler-inertial interconnections in the stellar-inertial-Doppler system, the instantaneous relative orientation between these coordinate systems must be known.

When the vehicle is on the ground it is possible to accurately determine this orientation using conventional optical techniques. However, when the vehicle is airborne the orientation changes rapidly with time in a somewhat random manner because the vehicle structure is constantly bending or flexing as changes occur in armament and fuel loads, outside temperature and pressure, and vehicle speed and altitude. The errors introduced by these fluctuations in orientation appear in the system as errors in the Doppler radar velocity output. In particular, changes in orientation about a vertical axis are equivalent to errors in Doppler drift angle, and changes in orientation about horizontal axes cause errors in the velocity outputs comparable to pitch and roll angles. Although from experience it has been found that the pitch and roll errors cause second order effects in the Doppler horizontal velocity outputs which are small enough to be neglected, the drift angle errors are significant and therefore must be compensated for.

Thus, it is the primary purpose of the instant invention to disclose a Doppler-inertial navigation system including means for determining the orientation error introduced by random flexure and bending of the airborne vehicle and for compensating for this error without impairing overall system accuracy.

Briefly stated, it is proposed to mount a conventional directional gyro directly onto or immediately adjacent the Doppler antenna and to only approximately align the gyro's spin vector relative to true north. The angle measured by the gyro between approximate true north and the Doppler antenna's reference axis will thus be equal to the sum of the true heading angle, the gyro's north alignment error angle, and the disorientation angle between the inertial and Doppler axes respectively. The gyro's output is then added to the drift angle obtained from the Doppler radar, and the resultant angle is used to resolve the vehicle's ground track velocity vector, also obtained from the Doppler, into north and east components. The latter are then resolved again by the true heading angle obtained from the stellar-inertial platform to provide the cross-track velocity vector referenced to the directional gyro's axis. A similar resolution of the inertially derived horizontal velocities yields the cross-track velocity component relative to the inertial platform's axis. The two resolved cross-track velocity components are then algebraically added to provide a velocity error signal proportional to the cross-track alignment error between the inertial platform and directional gyro axes. This error signal is then fed back through a closed loop to the directional gyro to precess its spin axis until the alignment error is nulled, at which point the output of the directional gyro will be a measure of true heading plus the orientation error. Accordingly, in the steady state, the directional gyro will be slaved to true north as determined by the stellar-inertial platform and the resolved Doppler velocity outputs will reflect no orientation error due to vehicle flexure or bending.

Detailed description of the invention

Figure 1:
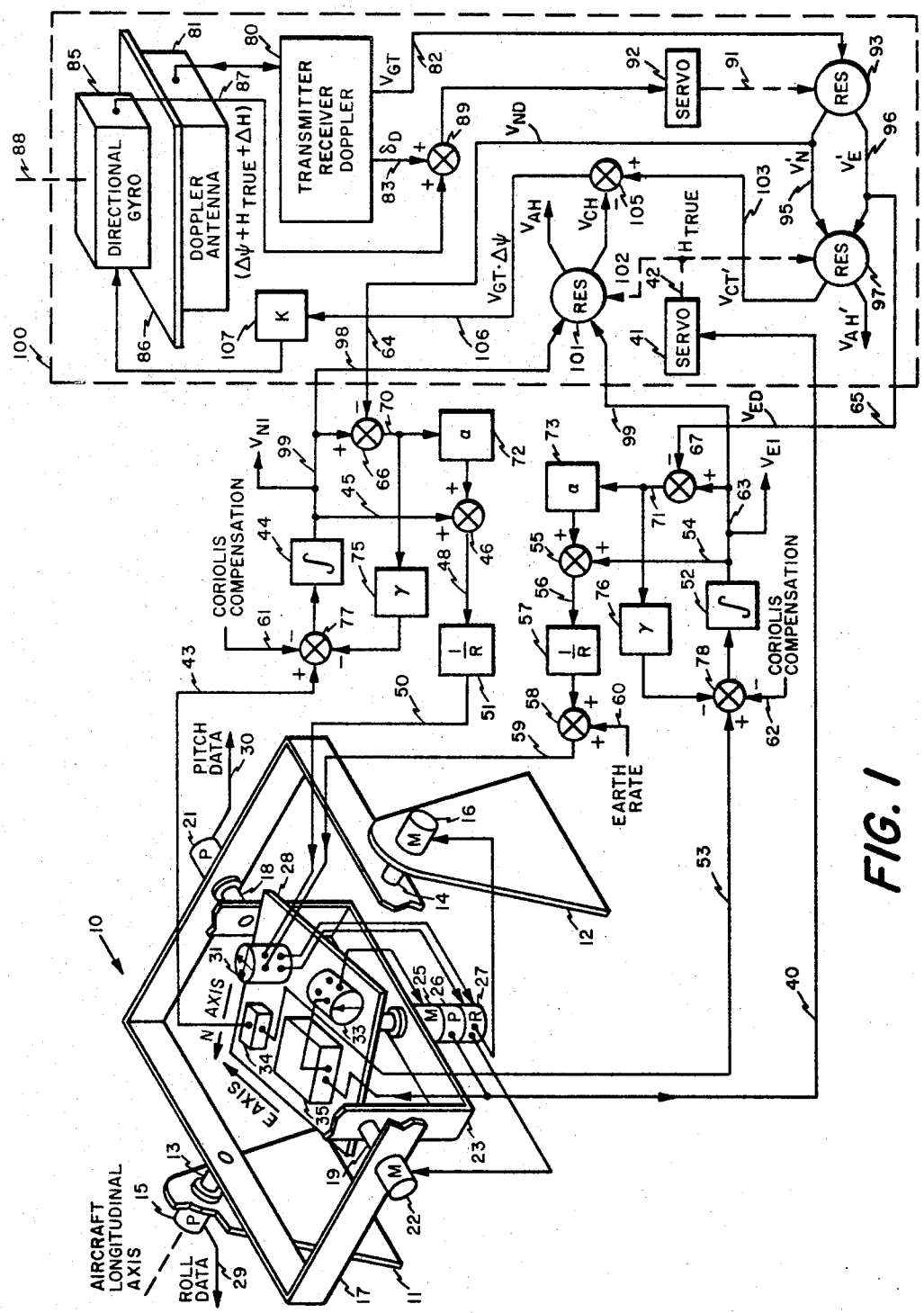
FIG. 1 is a diagram partly in perspective and partly in block form depicting the system according to the invention.

Referring now to FIG. 1, there is shown generally at 10 a stabilized inertial platform. The two uprights 11, 12 which may be considered part and parcel of the navigated vehicle's airframe have journaled therein respectively colinear shafts 13, 14 with their common axis parallel to the longitudinal axis of the vehicle as shown. Shaft 13 is directly coupled to the rotor of a pickoff device 15 such as a synchro-transmitter, the stator of which is fastened to the upright 11. Likewise, shaft 14 is directly coupled to the rotor of torquing motor 16 fixed to the upright 12. The ends of shafts 13 and 14 support a normally horizontal outer gimbal ring 17 for rotation about the aircraft's longitudinal roll axis; the ring, in turn, having journaled therein colinear shafts 18, 19 whose common axis is aligned relative to the airframe's transverse or pitch axis. One end of shaft 18 is directly coupled to the rotor of pickoff unit 21 whereas one end of shaft 19 is directly connected to the rotor of motor 22. The pickoff and the motor are fixed respectively to gimbal ring 17. The remaining ends of shafts 18, 19 support a normally vertical inner gimbal 23 which although shown broken away in FIG. 1 is preferably a full ring and includes a normally vertical shaft 24 rotatably journaled in both its upper and lower portions. Shaft 24 aside from its obvious function as a rotatable support for inertial platform 28 also serves as a common rotor for a torquing motor 25, a pickoff unit 26 and a coordinate resolver 27, all of which have their stators fixed to gimbal 23. The platform 28 being orthogonally related to shaft 24 is therefore normally horizontal. Unless noted otherwise, it is to be understood that the terms vertical, and horizontal, as discussed in the instant disclosure, are referenced with respect to a local vertical passing through the airframe and the center of the earth.

As schematically indicated in FIG. 1 there are directly mounted on inertial platform 28 for rotation therewith two gyroscopes 31, 33, an accelerometer 34, and a stellar-tracker 35.

Each gyroscope preferably comprises, for example, a conventionl two-axis rate integrating floated type having its two-output axes coincident with the axis of its cylindrical casing, while its two input axes are perpendicular to both spin axes and output axes, respectively. The gyros are therefor sensitive to torques having components tending to rotate their gyro wheels about either input axes and will respond to such torques by precessing about their corresponding output axes. Thus, as can be seen in FIG. 1, gyro 31 is located so that one of its input axes is parallel to one dimension of platform 28 while its other input axis is perpendicular to the first axis and parallel to the other dimension of the platform. In similar fashion gyro 33 is placed on the platform such that one of its input axes is normal to the platform or parallel to shaft 24. The remaining input axis of gyro 33 is actually redundant and therefore may be disregarded. In fact it will be appreciated that gyro 33 may be replaced by a single axis gyro and that two separate single axis gyros may be substituted in lieu of gyro 31, the illustrated arrangement being preferred merely in the interest of compactness.

As is well-known each gyro is provided with a pickoff device about its output axis which generates an electrical signal indicative of the time integral of the rate of rotation about the input axis. Furthermore, each gyro is also provided with a pair of torquers to allow the application of torques to each output axis. Because of the way gyro 31 is arranged it will sense rotations about mutually perpendicular axes in the plane of the platform and its pickoff devices will therefore generate signals whenever the platform 28 deviates or tilts from the horizontal. Similarly, gyro 33 will sense rotations of the platform 28 about a vertical axis orthogonally related to the plane of the platform and therefore will generate positional error signals in azimuth.

When the platform is initially made horizontal one of the input axes of gyro 31 is aligned relative to a suitable reference direction, say, true north, for example, and its other input axis will therefore be aligned with respect to true east. Obviously, any x–y coordinate orientation in inertial space may be chosen instead, the use of north and east directions being preferred here merely for the convenience of illustration. Hence, gyro 33 (the azimuth gyro) will measure the angular deviation of platform 28 or heading with respect to true north.

In order to insure extreme accuracy in the heading data output of the inertial platform, a conventional stellar-tracker 35 is directly mounted thereon as schematically indicated and is utilized in a closed loop around the azimuth gyro 33. Since the structural details of stellar-trackers are well-known in the art, and furthermore are not necessary for a proper understanding of the invention, they will not be described herein. Suffice it to say that by optically sensing the angular relationships between its instantaneous position and a known cluster of stars and then comparing this information with data stored in a digital computer the stellar-tracker is capable of delivering extremely accurate continuous heading output data provided equally accurate vertical information is made available. In accordance with the present invention the heading information obtained from the stellar-tracker is compared continuously with the heading information provided by the azimuth gyro and any error signals therebetween fed back to the gyro for continuous updating of same. In this manner the highly accurate stellar-tracker may be said to be continuously calibrating the less accurate gyro. The highly accurate heading information obtained from the combined stellar-inertial system may then be used in other parts of the system.

To illustrate, assume the vehicle is navigating a course at a heading angle equal to zero; that is, the north reference direction of the platform and the longitudinal axis of the aircraft are parallel. Also, let it be further assumed that for the time being there will be no changes in roll and pitch and therefore the platform 28 will remain horizontal. Now suppose the vehicle changes its heading and the platform 28 rotates with the aircraft about the latter's vertical or yaw axis. This motion torques the azimuth gyro's input axis causing the gyro to tend to precess about its output axis. The gyro's pickoff senses the output torque and generates an error signal in proportion thereto which error signal is then fed back to servo motor 25. The latter in response drives shaft 24 in the direction required to null the azimuth gyro's north alignment error and therefore its own torquing input signal. At this point the platform should presumably be realigned to true north; however, this is rarely the case owing to random drift in the gyroscope. In order to cancel this gyro drift error the gyro's heading information is repeated through pickoff 26 and fed into the stellar-tracker 35. Previously the tracker had very accurately measured and stored the heading angle information when platform 28 rotated away from true north. Thus, by comparing this data with the heading information read by the gyro and repeated through pickoff 26, an error signal may be developed in the tracker equivalent to the gyro's drift rate. This error signal is then fed back through the gyro's torquing input to precess its output axis accordingly, further energizing motor 25 until the angular information read out by pickoff 26 is equal to the heading angle measured by the stellar-tracker. It will thus be appreciated that the information made available on conductor 40 is for all intents and purposes equal to the instantaneous true heading as seen by the stellar-inertial platform. This very accurate data is repeated through servo 41 and the rotation of the latter's shaft 42 and used in other parts of the system as will be explained below.

In order to maintain platform 28 horizontal, gyroscope 31 is utilized in much the same manner as gyro 33. That is, gyro 31 senses rotations about its north and east input axes, respectively, and their respective pickoff devices generate error signals whenever the platform 28 tilts. These error signals however, cannot be used directly to level the platform because the north axis is not, in general, parallel to the longitudinal axis of the aircraft. Instead, the pickoff devices on gyroscope 31 are coupled to the rotor windings of a conventional inductive coordinate resolver 27 the rotor of which is positioned by the shaft 24 as previously explained. Because this resolver is adapted to transform the error signals developed in the inertial platform's north-east coordinate system into equivalent error signals in the aircraft's airframe coordinate system, it may then pass proper error signals to gimbal torquing motors 16 and 22, respectively, for leveling the platform.

It is apparent that if the platform 28 were initially made horizontal the apparatus described above would tend to keep it so. However, the platform would eventually depart from horizontality because of the curvature of the earth, the motion of the aircraft with respect to the earth, and the random drift rates inherent in all gyroscopes. The effect of these factors is made exceedingly small by providing additional apparatus to be described immediately below.

Although a horizontal platform is necessary to provide the extremely accurate vertical reference information required by the stellar-tracker 35 and the ancillary devices, if any, associated with the Doppler-inertial system in the vehicle, the prime purpose for maintaining the platform level is to provide a support for the two-axis accelerometer 34 so that it may sense vehicle acceleration only and not the acceleration of gravity. Bearing in mind that the function of the inertial system is to measure velocity by integrating the outputs of an accelerometer, the two-axis unit 34 is mounted on platform 28 so that its sensitive axes are directed along the true north and true east reference directions established by the action of the stellar-tracker in the azimuth gyro servo loop. Since two-axis accelerometers of the type preferred for use herein are well-known in the art, it will be sufficient for the purpose of explaining the present invention to merely assume therefore that the accelerometer provides two unidirectional output voltages the polarities and magnitudes of which represent the sensed amount of vehicle acceleration in the north and east directions respectively. Accordingly, a voltage proportional to the acceleration in the north direction is continuously applied along circuit path means 43 to an integrating circuit 44, the output of which is proportional to aircraft velocity in the north direction, $V_{NI}$. This voltage is then fed back through a loop comprising conductor 45, summing point 46, conductor 48, block 51, conductor 50 and applied to the torquing input of gyro 31 for continuous slight precessing of the latter's north output axis in order to keep platform 28 horizontal as the aircraft navigates over the curved surface of the earth. Block 51 is instrumented in a known manner to provide a scaling factor equal to the earth's radius and to introduce a further correction factor necessary because the curvature of the earth near the poles is different from that near the equator.

Similarly, the output voltage corresponding to the acceleration is the east direction is fed from accelerometer 34 along conductor 53 to integrating circuit 52, the output voltage of which corresponds to velocity in the east direction, $V_{EI}$. The last mentioned voltage is then fed back through a loop comprising conductor 54, summing point 55, conductor 56, block 57 (whose function is identical to that of block 51, above) summing point 58 and conductor 59 to the torquing input of gyroscope 31 to precess the latter's east output axis and thereby continuously establish a new zero reference position therefore at a rate determined by the earth's changing curvature in the east direction. Since the accelerometer measures acceleration with respect to inertial space, however, its integrated outputs give velocity with respect to inertial space. It is necessary, therefore, to correct for the effect of the earth's angular velocity along the east-west axis in order to obtain ground velocity for navigation over the earth's surface. This requirement is met by introducing a correction factor into the east loop equal to the earth's sidereal rotation rate as indicated generally by arrow 60 and summing point 58, and by introducing compensations for Coriolis accelerations in both the north and east loops as indicated generally by arrows 61 and 62, respectively. Suitable circuits for deriving and supplying the earth rotation rate correction and the Coriolis compensation are fully disclosed, for example, in the aforementioned U.S. Patent No. 2,914,763.

From the foregoing it will be appreciated that a pure inertial system is capable of providing accurate outputs indicative of linear horizontal velocity in both the north and east directions as well as true heading. In addition, this system produces an indication of the true vertical direction as represented by the horizontality of platform 28 which in practice is sensed by securing components of roll and pitch data from gimbal bearing takeoff devices 15 and 21, these component outputs being schematically indicated by data output lines 29 and 30 respectively. However, in the material presented thus far, no consideration has been given to what happens when there is an error in the vertical; that is, when the inertial platform 28 is not level. Nor has any consideration been given to the effects of gyro drift, accelerometer noise, instrumentation errors and the like. It is obvious that an error in the vertical will cause a component of gravitational acceleration to appear in the accelerometer outputs which when integrated, will lead to error in velocity and subsequently to errors in the gyro torquing rates and heading. Likewise, gyro drift and errors in computation of the earth rotation rate lead to errors in the torquing rates and the ground velocity respectively while accelerometer errors have the same effect as a gravity component. Even if there are no initial errors, the errors or noises just described act as forcing functions causing disturbances to be propagated throughout each of the loops and hence cause errors in vertical, velocity and heading. Moreover, by deriving the differential equations that describe the behavior of a loop comprising a gyro, an accelerometer, and an integrator, such loop being subject to the forcing functions mentioned above, it can easily be shown that the loops in question are inherently undamped, that is, errors which appear in the system measurement of velocity and vertical do not die out but are oscillatory in nature and persist indefinitely at a constant characteristic frequency. And, unless some damping is provided, these oscillations will continually increase in amplitude gradually building to intolerable levels with the passage of time.

Now it is well-known in the prior art that the oscillations that build up in each loop of a pure inertial system can be damped or even entirely eliminated by using an external, independent source of velocity measurement such as that provided by a Doppler radar. The two measurements of velocity can then be compared and their difference used to correct the inertial system.

To elaborate, assume momentarily that instead of the apparatus shown within the rectangle 100 indicated by the broken lines in FIG. 1, there exists a conventional Doppler radar set capable of producing, independently of the inertial system, output datum representing measurements of the vehicle's linear horizontal velocity in the direction of ground track $V_{GT}$ and of the vehicle's drift angle $\delta_D$. Furthermore, let it be assumed that there is no misalignment due to airframe flexure between the inertial platform's reference axis and the Doppler antenna's reference axis. Now, by algebraically adding the true heading angle obtained from the inertial platform's azimuth pickoff to the drift angle derived from the Doppler receiver, the resulting total track angle information may be used to resolve the Doppler velocity output into a north component $V_{ND}$ and an east component $V_{ED}$ thus relating the ground track velocity measured by the Doppler system to the reference coordinate system of the inertial platform. The resolved Doppler velocity components may now be applied to the inertial system via conductors 64 and 65 respectively for direct comparison with the inertially derived velocity components in the north and east directions respectively. The resulting velocity error signals are then used to tune and damp each loop before being added to their corresponding gyro torquing rates.

More specifically, the independently measured Doppler velocity components are algebraically added to the corresponding inertially derived velocities in summing devices 66 and 67 respectively to produce error signals $\Delta V_N$, $\Delta V_E$ on lines 70 and 71 respectively. These error signals, reflecting the instantaneous difference between the inertially measured and Doppler derived velocity components, are then fed back through the north and east inertial loops respectively for trimming the north and east output axes in gyroscope 31 until the aforementioned independently measured velocity components are equal. Simultaneously, the difference signals are fed back around each integrator for damping. When this occurs on a steady state basis the gradual buildup of errors in the inertial system is prevented and the inertial platform is continuously maintained in its horizontal reference position.

In any closed loop where the generation of error signals tends to generate forces restoring the system to equilibrium conditions, the error signals cause the system to overshoot the equilibrium position and to oscillate about this position, at a frequency or period of oscillation depending upon the characteristics of the system. An interconnected Doppler-inertial system provides no exception. In fact, it has been found that optimum operation of such a system occurs when the characteristics of the velocity error feedback loops are selected so that each loop oscillates at the so-called Schuler frequency, or with a period of approximately 84 minutes.

Accordingly, the north velocity error loop comprising accelerometer 34, integrator 44, summing points 66 and 46, conductor 48, block 51, conductor 50 and gyro 31 is provided with suitable gain adjustment means indicated generally by block 72 and conveniently labeled by the Greek letter alpha, so that this loop may be adjusted to a period of approximately 84 minutes. Since this changes the natural period of the loop, it is called tuning.

Similarly, the east velocity error loop comprising accelerometer 34, integrator 52, conductor 63, summing points 67 and 55, conductor 59, and gyro 31 is provided with suitable alpha-gain adjustment means 73 so that it may be Schuler tuned in exactly the same manner.

Recalling that some form of damping from an external source of velocity is required, conventional rate feedback loops are utilized to apply the error signals $\Delta V_N$, $\Delta V_E$ to the input of each velocity integrator 44 and 52. In the north loop the correct damping is provided by a gain adjustment means indicated generally by block 75 and identified for convenience by the Greek letter gamma. As shown in FIG. 1, this error rate damping is taken from line 70 and negatively fed back into integrator 44 via summing point 77.

In corresponding fashion, an error rate feedback loop is provided in the east loop around integrator 52 comprising line 71, gamma-gain adjustment means 76 and summing point 78.

Thus, in summarizing the operation of a Doppler-inertial navigation system it will be appreciated that the Doppler radar provides independently of the inertial system, measurements of ground track velocity and drift angle. The former is resolved into north and east components and compared continuously with the north and east components of velocity measured by the inertial system. The resulting error signals are then fed back to the inertial platform to continuously equalize the inertial velocity output with regard to the radar's velocity output and thus maintain the platform level independently of the passage of time.

In the above description of a Doppler-inertial system including a stellar-tracker for obtaining accurate heading outputs it was assumed that there exists no orientation error between the stellar-inertial platform and the Doppler antenna. However, as mentioned earlier, when such systems are installed in airborne vehicles it is often necessary to physically separate the platform and the antenna. In-flight flexure modes of the airframe invariably result, producing a randomly fluctuating disorientation between the stellar-inertial platform's reference axis and the Doppler antenna's reference axis which in turn leads to contamination of the Doppler velocity outputs particularly in the drift or cross-track direction.

Figure 2:
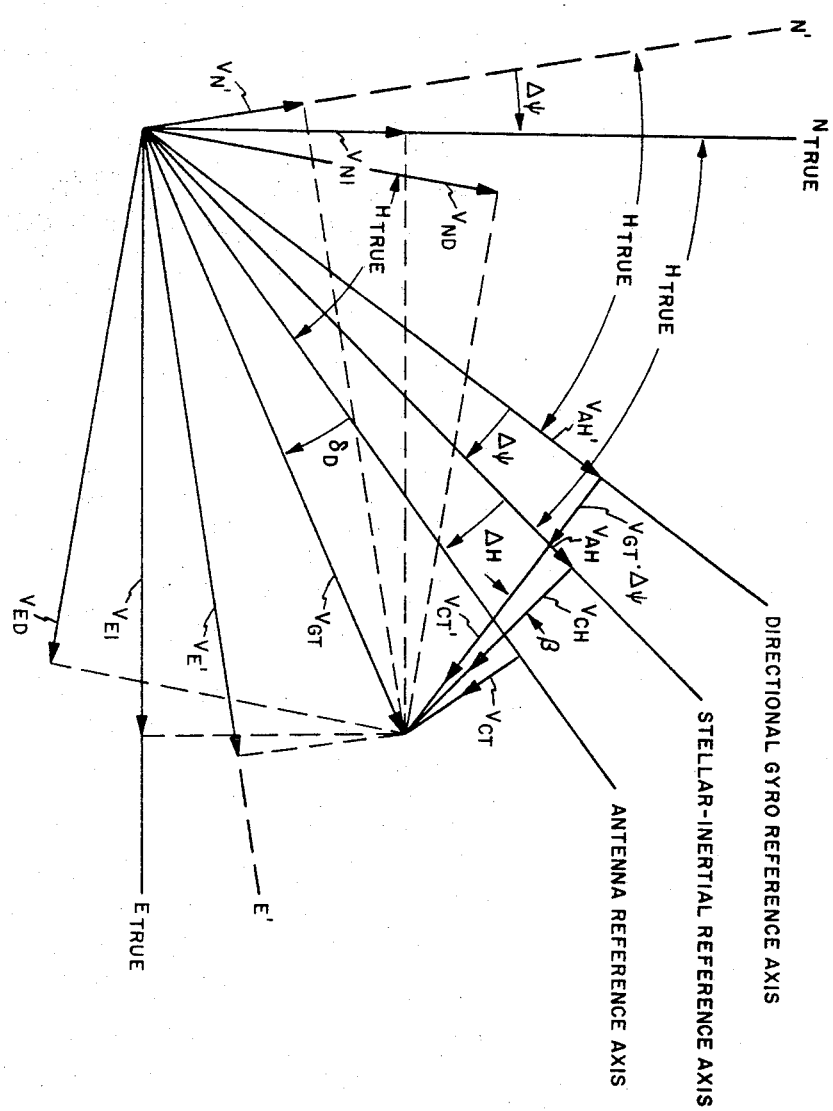
FIG. 2 is a geometrical sketch illustrating the various coordinate axes involved in this system.

In order to appreciate this problem more completely, attention in now directed to FIG. 2.

The Doppler radar accurately measures the vehicle's ground speed vector relative to a coordinate reference axis at its antenna. Thus, in the context of FIG. 2, the radar produces useful output datum including ground track velocity $V_{GT}$ and drift angle $\delta_D$ with it being assumed that the antenna's reference axis coincides with the airframe's longitudinal axis at the antenna mounting position. Similarly, the stellar-inertial system measures the north and east components of $V_{GT}$, namely $V_{NI}$ and $V_{EI}$, with respect to the airframe's longitudinal axis at the stellar-inertial platform's mounting position. Now ideally speaking, in the absence of "inflight" airframe flexure, the platform's reference axis and the antenna's reference axis should be colinear. However, as mentioned, under actual flight conditions these axes are constantly being disoriented relative to each other. Thus in FIG. 2, the angle $\Delta H$ is chosen to represent the angular error between the axes in question, it being understood that $\Delta H$ is rarely a fixed angular deviation but changes constantly in a rapid and random fluctuating manner.

It will be recalled that the Doppler velocity output $V_{GT}$ is to be resolved by the total track angle $$H_{\text{True}} + \delta_D \quad (1)$$

where $H_{\text{True}}$ is equal to the highly accurate heading angle obtained from the Stellar-inertial platform and $\delta_D$ is an accurate measure of drift angle obtained from the Doppler receiver. Yet when this resolution is attempted in the presence of the orientation error $\Delta H$, the resulting velocity components $V_{ND}$ and $V_{ED}$ have significant angular resolution errors relative to true north and true east respectively as can be clearly observed in FIG. 2.

It is apparent therefore that if by some means the orientation error $\Delta H$ could constantly be computed, its associated error signal could accordingly be used in the resolution process to derive uncontaminated velocity components $V_{ND}$ and $V_{ED}$. However, owing to the rapidly changing and random nature of the flexural modes encountered in practice it has been found to be impractical to directly measure $\Delta H$.

Rather, in accordance with the instant invention, a somewhat more indirect computation method has been conceived leading to the development of suitable and sufficient means for effectively freeing stellar-Doppler-inertial systems from the undesirable effects produced by disorientations between the stellar-inertial platform and the Doppler antenna. Such means are schematically shown within the dashed line rectangle 100 in FIG. 1.

With reference to the latter there is a conventional Doppler radar comprising a transmitter-receiver 80 and an antenna 81. The transmitter-receiver furnishes microwave energy to the antenna which then radiates the energy toward the earth in the form of a plurality of beams. Due to the relative movement between the earth and the vehicle the portion of energy reflected by the earth and detected by the antenna and receiver has undergone the familiar Doppler frequency shift. This information is then processed in the receiver's frequency tracker to yield two output signals, the first indicative of ground track velocity $V_{GT}$, and the second an error signal representing the deviation of the antenna from alignment with ground track. The latter error signal may be applied to an azimuth servo mechanism (not shown) for realigning the antenna relative to ground track in which case an output indicative of the vehicle's drift angle $\delta_D$, may be taken from the servo motor's shaft. This drift angle data may then be converted into voltage information through a standard synchro-transformer. Thus, in FIG. 1, the Doppler transmitter-receiver 80 is shown to have two output lines 82 and 83 for rendering available ground track velocity and drift angle informations respectively.

Now in accordance with the principles of the invention it is proposed to physically locate a relatively inexpensive conventional single-axis directional gyroscope sufficiently close to the Doppler antenna such that the angular disorientations of the antenna's reference axis with respect to the inertial platform's reference axis will be directly transmitted to the outer casing of the gyro. Thus, for convenience of illustration, the directional gyroscope 85 is shown mounted directly atop the Doppler antenna via common supporting plate 86 with the gyro's input axis 88 extending normal to the plane of the antenna as indicated. In other words, when the vehicle is horizontal, the input axis will be parallel to a local verticle passing through the vehicle and the center of the earth. Of course, it will be understood that the antenna is free to rotate in azimuth relative to plate 86 which latter is fixed to the vehicle's airframe. Furthermore, if deemed desirable, the roll and pitch data made available on lines 29 and 30 may be used to drive antenna gimbal torquers (not shown) to stabilize the supporting plate 86 in pitch and roll and thereby maintain both the antenna and the gyro in a horizontal attitude. Then, before takeoff when the vehicle is on the ground, the directional gyro is only approximately aligned to true north. That is, the zero precessional or reference position of the gyro's spin axis is roughly pointed to true north as indicated schematically by the symbol N' in FIG. 2. Inasmuch as the zero error reference position for the azimuth gyro on the stellar-inertial platform is always exactly aligned to true north, the spin axis of the directional gyro will be angularly displaced from the inertial platform's reference axis by its own north alignment error which unless compensated for will eventually be aggravated by the inherent random drift in the directional gyro. This error is graphically represented in FIG. 2 by the angle $\Delta \psi$.

During the initial stages of flight, therefore, the pickoff on the directional gyro senses various torques tending to precess the gyro's output axis and generates error signals accordingly. This error signal at any given moment will be equal to the sum of the true heading angle ($H_{\text{True}}$), the gyro's north alignment and/or drift error ($\Delta \psi$), and the disorientation angle ($\Delta H$). The last mentioned is so because the directional gyro 85 is mounted on support plate 86 and thus directly follows the Doppler antenna's flexural perturbations relative to the stellar-inertial platform.

The directional gyro's output error signal is then fed through circuit path means 87 until it is added in summing unit 89 to the drift angle information on output line 83. The output of summing unit 89 comprising the total track angle between the velocity vector $V_{GT}$ and approximate true north N'

$$H_{\text{True}} + \Delta H + \Delta \psi + \delta_D \quad (2)$$

is then converted into the rotation of a shaft 91 via servo mechanism 92 for resolution of the ground track velocity signal $V_{GT}$ on line 82.

In response to the rotation of shaft 91, coordinate resolver 93 resolves the ground track velocity input $V_{GT}$ into a north component $V_N'$ and an east component $V_E'$. These components, as can best be seen in FIG. 2, contain resolution errors which are a function of the directional gyro's alignment or drift error $\Delta \psi$ and hence cannot yet be directly compared with the independently derived inertial components $V_{NI}$ and $V_{EI}$, respectively, via conductors 64 and 65, respectively.

Instead, $V_N'$ and $V_E'$ are fed along lines 95 and 96, respectively to a second resolver 97 wherein they are coordinate rotated through the true heading angle obtained from the inertial platform and repeated through servo 41 and the rotation of shaft 42. As is made evident in FIG. 2 this resolution produces cross-heading velocity ($V_{CT}'$) and along heading velocity ($V_{AH}'$) components of $V_{GT}$ with respect to the directional gyro's reference axis.

Simultaneously, the inertially derived velocities $V_{NI}$ and $V_{EI}$ are fed along lines 98 and 99 into a third resolver 101 which also has as its angular input the true heading information on rotating shaft 42. As a result, the inertial velocities have their coordinates rotated into along-heading ($V_{AH}$) and cross-heading ($V_{CH}$) components with respect to the stellar-inertial platform's reference axis.

The cross-heading velocity component $V_{CH}$ from resolver 101 is then fed along line 102 to an algebraic summing device 105 where it is subtracted from the cross-heading velocity component $V_{CT}'$ obtained from resolver 97 along line 103.

From FIG. 2 it is obvious that the angle $\beta$ will be very small; hence, the difference signal appearing on conductor 106 may be assumed to represent the cross-track velocity error between the directional gyro and the stellar-inertial platform and to be substantially equal to $$V_{GT} \cdot \Delta \psi \qquad (3)$$

In other words, the last mentioned error signal is a function of the directional gyro's alignment error relative to the stellar-inertial platform. Moreover, since the latter will always be aligned to true north, the signal on line 106 may be fed back to the directional gyro's torquing input for precessing this gyro's output axis until it too is aligned to true north. In response, the alignment error in the directional gyro's output will null, leaving datum therein reflecting only the true heading angle and the disorientation angle $\Delta H$. As a result, the angle information fed into resolver 93 via rotation of shaft 91 will now represent the track angle $$H_{True} + \Delta H + \delta_D \qquad (4)$$

and therefore, the outputs appearing on conductors 64 and 65 respectively, will comprise Doppler velocity components $V_{ND}$ and $V_{ED}$ correctly resolved along true north and true east respectively. These components then are fed back to the inertial system for direct comparison with $V_{NI}$ and $V_{EI}$ respectively as previously discussed.

Generally speaking, the directional gyro 85 is in a closed loop comprising summing point 89, the three resolvers 93, 97 and 101, and summing point 105. Thus, as long as there is no error signal on line 106 the loop will remain in equilibrium. When, however, a disturbance does appear within the loop the error signal $V_{GT} \cdot \Delta \psi$ will be generated tending to restore the loop to balance. Initially, this disturbance takes the form of the directional gyro's original north alignment error when the gyro is approximately aligned relative to true north. Thereafter, when the system is operating in the steady state any disturbances which occur in the loop will be due solely to the random drift in the directional gyro. In either case, the dynamic response of the closed loop is such as to immediately cancel these disturbances and restore the loop to equilibrium. The gain adjustment means schematically indicated by block 107 is provided to insure proper damping and stability of the loop's response.

In summarizing the operation of the above described apparatus, it might be helpful to refer again briefly to FIG. 2.

Assume the vehicle has been airborne for a short period of time and the system has been switched on for normal operation. Since the directional gyro was originally mounted directly on the Doppler antenna and only approximately aligned to true north, its positional error output data will immediately reflect the algebraic sum of the true heading $H_{True}$ of the vehicle (as measured by the stellar-inertial platform), the orientation error $\Delta H$, and its own north alignment error $\Delta \psi$.

An error signal is then extracted from the gyro's output proportional to the cross-track velocity error $V_{GT} \cdot \Delta \psi$ between the gyro and the inertial platform. Now by feeding this signal back into the gyro's torquer for precessing its output axis accordingly, the gyro's spin axis is effectively rotated toward the reference axis of the steller-inertial platform until both axes are aligned. At this point the north alignment error content in the gyro's output is cancelled, the error input to the gyro's torquer is nulled, and the gyro is aligned to true north. In addition, the output of the directional gyro now comprises only a measure of the true heading angle plus the orientation error $\Delta H$ and may therefore be used to correctly resolve the ground track velocity information obtained from the Doppler into true north and true east components. Moreover, despite the relative crudeness in the directional gyro's accuracy its spin axis will nevertheless remain dynamically slaved to true north as determined by the stellar-inertial platform because any drift in the gyro tending to disrupt this alignment will generate an error component in the latter's output tending to restore the alignment.

Thus, it will be appreciated that when the directional gyro loop is in equilibrium, the gyro's spin axis will be aligned parallel in space relative to the stellar-inertial platform's reference axis and remain so although the antenna's reference axis is constantly disorienting relative to this same axis in a rapid randomly fluctuating manner. Furthermore, since the directional gyro is physically fixed with respect to the antenna's reference axis and is in close proximity thereto, the gyro's input axis will dynamically sense and track the latter's perturbations. Accordingly, the gyro's pickoff device will generate a useful output voltage constantly reflecting the instantaneous magnitude and direction of the orientation error $\Delta H$ as well as an extremely accurate measure of the vehicle's instantaneous heading $H_{True}$.

In view of the foregoing it is apparent that suitable and sufficient means have been disclosed for calibrating an inertial-Doppler system by computing and compensating the orientation error resulting from "in-flight" flexure and bending of the supporting vehicle. By utilizing a conventional directional gyro mounted on or near the Doppler antenna in conjunction with standard coordinate resolvers, servomechanisms, and the like, as described above, the overall cost of the system has been kept extremely low without sacrificing overall system accuracies. And, although the invention was particularly described in connection with a Doppler-inertial system including a stellar-tracker for obtaining accurate heading outputs, this was done only by way of illustrating a preferred embodiment thereof. Obviously, the inventive concepts taught herein may be applied to any Doppler-inertial system where physical separation between the inertial platform and the Doppler antenna results in orientation errors of the type discussed above. For example, the heading reference apparatus disclosed in copending application Ser. No. 653,974 commonly assigned, may be substituted for the stellar-tracker mentioned herein without departing from the principles of the invention.

Since many additional modifications within the spirit

What is claimed is:

1. Vehicle navigational apparatus, comprising,
   inertial means for deriving signals indicative of the vehicles ground speed velocity components along a first preselected reference direction and along a second direction normal thereto,
   said inertial means further including means for deriving a signal representing the vehicle's instantaneous heading relative to said first preselected reference direction,
   separate Doppler radar means for independently deriving signals indicative of the vehicle's ground track velocity and drift angle,
   means responsive to said inertially derived heading signal and said Doppler derived drift angle signal for resolving said Doppler derived ground track velocity signal to obtain Doppler velocity components along said first preselected direction and along said second direction normal thereto, respectively,
   comparator means responsive to said Doppler velocity components and said first mentioned velocity components independently derived from said inertial means for producing error signals representative of the difference therebetween respectively,
   means for feeding said respective error signals back to said inertial system for utilization therein, and
   means for automatically computing any error introduced into said Doppler derived velocity components by irregularities in alignment between the vehicle's longitudinal axis at said Doppler radar means and said inertial means, respectively.

2. The apparatus of claim 1, further comprising,
   means responsive to said last mentioned means for continuously removing said alignment error from said Doppler derived velocity components.

3. The apparatus of claim 2 wherein said means for automatically computing and removing said alignment error comprise,
   gyroscopic means physically located in sufficient proximity to said Doppler radar means for continuously emitting an error signal representing the sum of the angle between said vehicle's longitudinal axis at said inertial means and said first preselected reference direction and the angle between said longitudinal axes, respectively, and
   means for maintaining the zero error reference axis of said gyroscopic means in accurate alignment with said first preselected reference direction.

4. The apparatus of claim 3 wherein said gyroscopic means comprises a single-axis directional gyroscope having its input axis aligned parallel to a local vertical passing through the gyroscope and the center of the earth.

5. The apparatus of claim 1 wherein said inertial means comprises a gyroscopically stabilized platform including stellar-tracker means for maintaining said platform's azimuth attitude accurately aligned along said first preselected reference direction.

6. A Doppler-inertial navigation system for use in airborne vehicles comprising,
   inertial sensing means for deriving signals indicative of the vehicle's ground track velocity components in the true north and true east directions respectively,
   Doppler radar sensing means for deriving signals representing the vehicle's ground track velocity and drift angle respectively,
   said inertial means and said Doppler means being remotely positioned within said vehicle,
   said inertial means further including means for deriving signals indicative of the vehicle's instantaneous heading relative to true north,
   gyroscopic means mounted on or near said Doppler radar sensing means for providing output signals indicative of the instantaneous angular displacement between said radar sensing means and approximate true north,
   means responsive to said gyroscopic means and said Doppler radar sensing means for deriving velocity signals resolved into approximate true north and true east components respectively,
   means responsive to said resolved approximations and said inertially derived heading signals for deriving north alignment error signals, and
   feedback means for coupling said north alignment error signals to said gyroscopic means for correction of the latter's output signals accordingly.

7. The system according to claim 6 further comprising,
   comparator means responsive to said inertially derived true north and true east velocity component signals and said resolved approximations respectively for deriving north and east velocity error signals respectively, and
   means for feeding back said velocity error signals to said inertial sensing means for utilization therein.

8. A system according to claim 7 wherein said inertial sensing means comprises,
   platform means,
   gyroscopic means for stabilizing said platform means relative to a mutually orthogonal three-axis reference, one axis of which always remain parallel to a local vertical passing through said platform means and the center of the earth,
   accelerometer means mounted upon said platform means and adapted to sense accelerations of the vehicle along directions defined by two of said mutually orthogonal axes other than said one axis,
   integrator means responsive to said accelerometer means for deriving signals representative of the vehicles velocity components along said directions defined by said two mutually orthogonal axes respectively,
   said velocity components being fed back to said gyroscopic means for continuous correction thereof.

9. A system in accordance with claim 8 wherein said inertial means further comprises,
   heading reference means mounted for rotation on said platform means for deriving signals representative of the vehicles instantaneous heading,
   said heading signals being fed back to said gyroscopic means for additional correction thereof.

10. A system according to claim 8 wherein said velocity error signals are simultaneously fed back around said integrator means and to said platform mounted gyroscopic means for additional correction thereof.

11. The system according to claim 6 wherein said means responsive to said gyroscopic means and Doppler radar sensing means comprises,
    summing means for adding said gyroscopic means output signal to said Doppler derived drift angle signal to obtain a total track angle signal, and
    resolver means responsive to said summing means and said Doppler derived ground track velocity signal for coordinate rotation of said last mentioned signal through said total track angle.

12. The system according to claim 6 wherein said means for deriving north alignment error signals comprise,
    first resolver means responsive to said approximate true east component velocity signal and said inertially derived heading signal for deriving a first cross-track velocity signal relative to said gyroscopic means,
    second resolver means responsive to said inertially derived true east component velocity signal and said inertially derived heading signal for deriving a second cross-track velocity signal relative to said inertial sensing means, and
    summing means for algebraically adding said first and second cross-track velocity signals to obtain said north alignment error signal.

13. A system according to claim 6 wherein said gyroscopic means output signal represents the instantaneous angular displacement between said radar sensing means and exact true north when said north alignment error signal fully corrects said gyroscopic means output signal.

14. A system according to claim 6 wherein said means responsive to said gyroscopic means and said Doppler radar sensing means comprises means for deriving velocity signals resolved into exact true north and exact true east components respectively when said gyroscopic means output signal is fully corrected by said north alignment error signal.

References Cited

UNITED STATES PATENTS

| | | | |
|---|---|---|---|
| 2,908,902 | 10/1959 | Gray et al. | 343—9 X |
| 2,914,763 | 11/1959 | Greenwood et al. | 343—9 |
| 3,028,592 | 4/1962 | Parr et al. | 343—8 |
| 3,131,390 | 4/1964 | Condie et al. | 343—8 |
| 3,140,482 | 7/1964 | Duncan et al. | 343—8 X |
| 3,167,763 | 1/1965 | Barkalow et al. | 343—9 |

RODNEY D. BENNETT, *Primary Examiner.*

C. L. WHITHAM, *Assistant Examiner.*